(12) United States Patent  
Newton

(10) Patent No.: US 6,230,982 B1  
(45) Date of Patent: May 15, 2001

(54) FLUID DISPERSING VALVE

(76) Inventor: Gary D. Newton, 19473 County Rd. #35, Eckley, CO (US) 80727

( * ) Notice: Subject to any disclaimer, the term of this patent is extended or adjusted under 35 U.S.C. 154(b) by 0 days.

(21) Appl. No.: 09/351,121

(22) Filed: Jul. 10, 1999

(51) Int. Cl.[7] .................................................... B05B 7/26
(52) U.S. Cl. .................... 239/10; 239/410; 239/533.13; 239/533.15; 239/562; 239/571; 239/589; 239/600; 239/310; 137/540; 137/843
(58) Field of Search .................... 239/10, 310, 201, 239/203, 204, 407, 410, 548, 562, 568, 570, 571, 533.2, 533.13, 533.15, 600, 601, 589, 590; 37/7, 540, 843, 896, 903; 366/167.1

(56) References Cited

U.S. PATENT DOCUMENTS

| | | | |
|---|---|---|---|
| 1,153,401 | * 9/1915 | Milne | 239/562 X |
| 2,279,002 | * 4/1942 | MacNeil | 137/540 |
| 2,524,129 | * 10/1950 | Klein | 137/540 X |
| 3,267,959 | 8/1966 | Savage . | |
| 3,326,232 | 6/1967 | Stamps et al. . | |
| 3,375,976 | 4/1968 | Stamps et al. . | |
| 3,464,626 | 9/1969 | Stamps et al. . | |
| 3,503,418 | * 3/1970 | Petrucci et al. | 137/540 X |
| 3,656,694 | * 4/1972 | Kirschke | 239/562 X |
| 3,693,656 | 9/1972 | Sauer . | |
| 3,782,412 | * 1/1974 | Darash | 137/540 X |
| 4,437,611 | 3/1984 | Gilroy . | |
| 4,715,393 | 12/1987 | Newton . | |
| 5,769,115 | * 6/1998 | Ohsaki et al. | 137/540 X |
| 5,799,871 | * 9/1998 | Theurer | 137/540 X |

* cited by examiner

Primary Examiner—David A. Scherbel  
Assistant Examiner—Steven J. Ganey  
(74) Attorney, Agent, or Firm—Lee G. Meyer; Snell & Wilmer, LLP

(57) ABSTRACT

A valve for dispersing a fluidic substance into a carrier fluid is disclosed. The valve is constructed from few moving parts and is particularly well adapted to distribute fluidic substances with little or no solubility in the flowing liquid into the carrier fluid. The valve is able to disperse difficult to dissolve fluids into the liquid stream by dispersing the fluidic substance into the carrier fluid at the stream's point of highest velocity and creating local turbulence at the points of dispersion. The design of the valve is such that the carrier fluid constantly flushes the valve's moving parts, and the valve is sealed from the dispersed fluidic substance to prevent jamming or clogging the moving parts by undissolved portions of the fluidic substance. The fluid pressure at which dispersal occurs and the volume of dispersal is precisely adjustable. The valve finds use in the irrigation of farmland, golf courses, athletic fields, public parks, and the yards of private homes. The valve is also used in manufacturing processes such as the petrochemical industry, chemical refining, and the food and beverage industry.

36 Claims, 3 Drawing Sheets

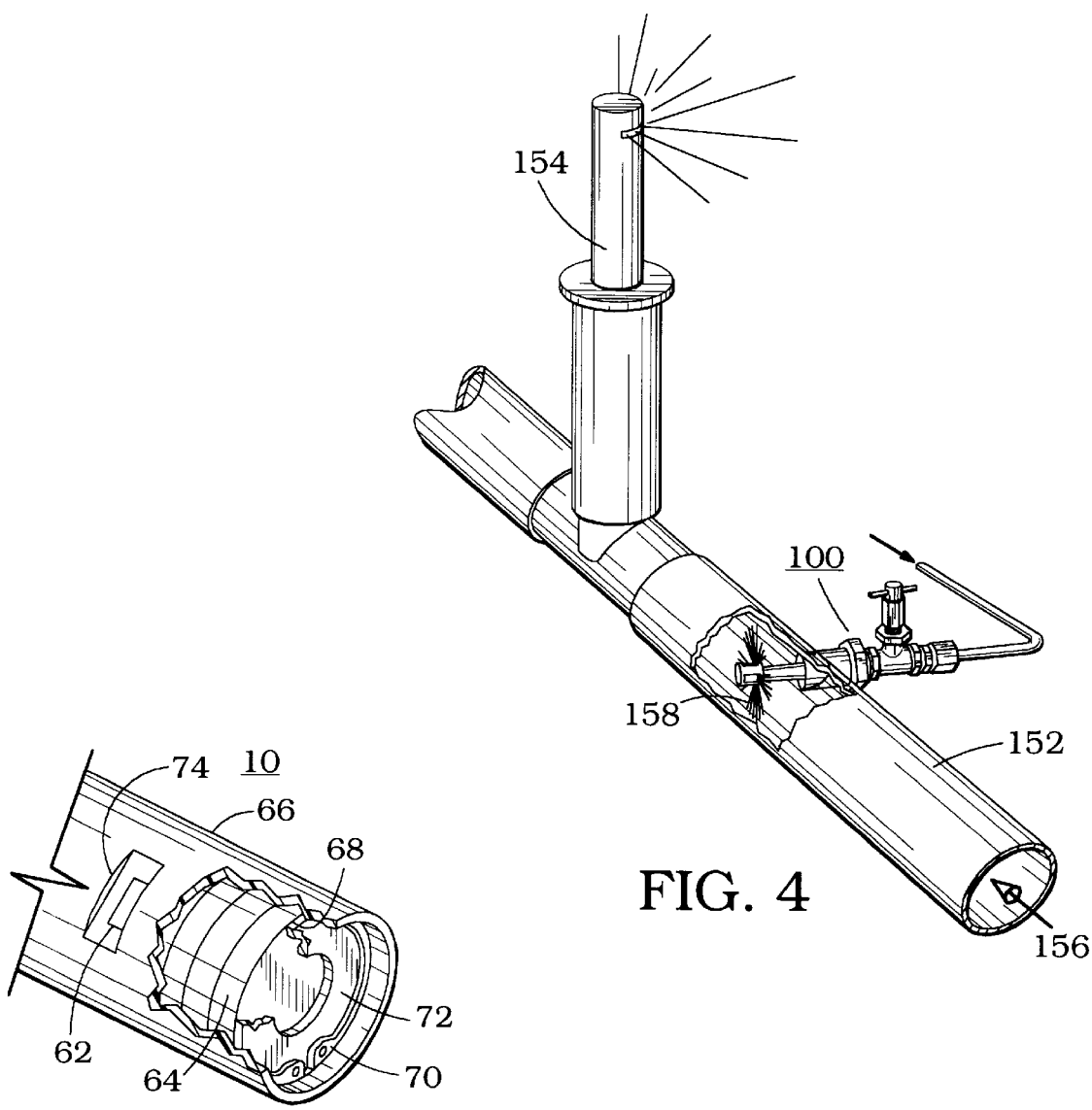
FIG. 4
FIG. 5
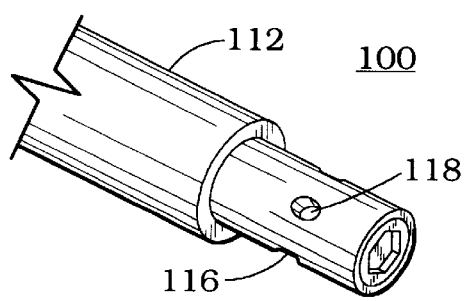
FIG. 6

FLUID DISPERSING VALVE

BACKGROUND OF THE INVENTION

1. Field of the Invention

This invention relates generally to valves for dispersing a fluid into a flowing liquid stream; and, more particularly to a check valve system for intimately admixing an amount of a fluidic substance into a flowing stream.

2. Related Art

Valves for dispersing a fluid into a flowing liquid stream are well known. The typical operation of these valves involve a remote operator or automated controller that opens and closes the valves through an actuator. Common actuators include knobs, cranks, solenoids, motors and the like. Gate valves and ball valves are particularly well suited to being turned on and shut off by an actuator. Unfortunately, these valves usually remain open for at least a short time after they have finished dispersing fluid, and the flowing liquid stream backflows into the valve feed lines. This backflow commonly results in the premature corrosion of the valve and unwanted contamination of the dispersing fluid.

One type of valve which automatically shuts to prevent backflow is, a so called, check valve. These valves are opened by the fluidic pressure of the fluid flowing through the valve assembly, usually against a constant force, such that when the opening pressure is terminated, the valve automatically shuts to prevent inadvertent leakage or mixing of the flowing fluid with the fluid to be distributed through the valve. Such valves are particularly useful for protecting an ecosystem where failure to maintain flow could allow back seepage into, for example, a reservoir, causing contamination. This is especially important with chemicals, sewage systems, portable water systems and the like. In many systems, especially aqueous systems, chemicals and other substances which can be highly toxic and sometimes highly insoluble in the aqueous stream are required to be mixed at a fairly high rate requiring the intimate dispersion of the substance flowing through the valve within the flowing stream to afford an even distribution and therefore admixing of the substance with the flowing stream. In these applications the valve configuration is particularly important.

One application of the valve is for adding agrochemicals to farmlands. This procedure has come to be known as chemigation and involves the introduction of agriculturally based chemicals into irrigation water to provide for intimate admixing of the chemicals and the irrigation water stream such that the subsequent dispersion of the irrigation water carries, well admixed therein, the agrochemicals onto the cropland. Chemicals such as fertilizers, insecticide, pesticides, herbicides, fungicides, etc., can be dispersed by this method in order to be effective. Such chemicals must be well dispersed in the irrigation water prior to the water being sprayed upon the cropland. Care must be taken in order to assure that in the event of a shutdown in the flow of irrigation water, the chemical will not flow into the water source causing contamination of the source of water. Also, it is necessary that irrigation water does not flow into the chemical supply system causing overflow and area contamination.

Although some agricultural chemicals are soluble in water, it is also desirable to effectively disperse chemicals which are not readily soluble or are insoluble in water. These chemicals are often dissolved in solvents such as kerosene which is water insoluble. Certain chemicals, such as fertilizers, are available as a slurry of solids in a liquid. Therefore, it is desirable to effectively disperse a water insoluble (or minimally soluble) material into a stream of irrigation water. Such a process requires production of small droplets or micelle like moieties of the substance proximate a current in the stream to intimately admix the substance in the irrigation water stream. The traditional gate valve or even the ball check valve do not posses the dynamics required to effect thorough, intimate admixing required. Even center posted flexible mixing valves lack the structure to provide the required mixing dynamics.

In addition to the need to disperse such agrochemicals in the large scale agri-industry, there is also a need to disperse chemicals in semi-commercial and domestic arenas. For example, golf courses, athletic fields, public parks and the like require fertilization, and control of unwanted vegetation, such as weeds. The irrigation system of choice for these applications is the "pop up" type head sprinkler systems. By the use of the above referenced dispersion techniques for placing herbicides, pesticides, and fertilizers directly into existing sprinkler systems, hundreds of thousands of dollars a year can be saved. Thus, golf greens, parkways, fairways, soccer, football and baseball fields, and public parks could be fertilized and otherwise treated by application of these chemicals through a pre-existing sprinkler system. However, in this application the dispersion mechanism must provide for very minute adjustments because the amount of water applied is significantly reduced from the standard type agricultural application. Likewise, in the domestic market the ability to simultaneously fertilize, apply insecticides, herbicides and the like through domestic sprinkler systems would be very desirable.

In addition to the agricultural industry, fluid dispersing valves find use in the petrochemical industry and other manufacturing processes, such as the food and beverage industry, where the intimate admixing of one fluid, liquid or gas into one or more fluids, liquids or gases is necessary. Such fluid dispersal can involve highly toxic or corrosive chemicals, and chemicals to be admixed at temperatures elevated or depressed from typical room temperatures. These applications require a dispersal valve which can function reliably in chemically hostile environments without the need for frequent cleaning of the valve causing significant downtime in the refining or manufacturing process.

Although there are many valves in the art, including check valves, they all suffer from one or more drawbacks which make them less than desirable, especially in maintenance free applications. Since the valve must be inserted directly into the flowing stream, they are hidden from view. This makes a maintenance free, simple system a must. This is especially true for domestic applications. The major drawback with the prior art valves is that they tend to clog or jam by buildup of chemicals not dispersed into the flowing stream. To remove any chemical buildup, the valve and the valve mechanism have to be continually "cleansed" with a portion of the flowing stream. Additionally, since many of the chemicals are marginally water soluble, as the valve opened, large amounts of undispersed material are released into the stream.

Examples of prior art valves are the Raguse valve sold under the trade name ShurMix In-Stream™ by Raguse & Co., Inc., P.O. Box 470507, Tulsa, Okla. 74147-0507. This valve is a ball valve designed such that as the ball is raised from the valve seat by the pressure of the fluid to be dispersed, the dispersion pattern becomes conical in shape flowing up and around the ball. The material is not forced outwardly into the flowing stream to intimately admix the chemical substance with the flowing stream. Additionally, the valve spring used to tension the ball in the valve seat has to be continually cleansed.

In order to overcome the disadvantage of the ball valve, a flat seated valve is disclosed in U.S. Pat. No. 4,715,393. This valve places all the operating parts of the check valve in the flowing stream to provide uniform and rapid dispersion of the fluid as well as a cleansing of the check valve mechanism to prevent jamming, sticking or the like. This flat valve then provides a radial dispersion pattern of the fluid parallel to the flowing stream as opposed to a conical dispersion pattern of the ball valve. The radial dispersion pattern provides for more intimate admixing of the fluidic substances into the flowing stream, while simultaneously preventing the clogging or jamming of the valve mechanism.

Savage, U.S. Pat. No. 3,267,959, discloses a valve which is said to function as an anti-fouling and anti-siphoning valve in irrigation systems. The valve is provided with a neck portion which is designed to extend into the flowing stream being treated so that the chemicals being discharged will be "immediately absorbed by the liquid and removed from the position of the valve proper." The valve is designed to open when the chemical being injected is subjected to pressure equal to, or greater than, the sum of the pressure of the fluid flowing in the pipe into which the valve extends. An array of slots is provided in the tip portion so that when the chemical flows past the O-ring seal the chemical can disperse through the slots thereby providing an early release of discharge pressure to avoid dislodging the O-ring seal. This valve has a significant disadvantage in that, when the flow rate of the chemical is increased and the valve member containing the O-ring travels past the end of the housing containing the slots, the valve stem can be subjected to a significant lateral force by the flow of the liquid stream past the valve. This lateral force can bend the valve stem resulting in failure of the O-ring valve to seat properly. Deflection of the extended valve stem can also result in the valve jamming open. Either effect will allow the chemical to continue to leak into the system, or allow liquid in the conduit to pass through the check valve back to the source of the chemical.

Gilroy, U.S. Pat. No. 4,437,611 (1984), discloses a spray nozzle to be used in a sprinkler system in a corrosive or dirty environment. The spray nozzle is designed to be mounted in a conduit wall essentially flush with the method and apparatus for dispersing substantially water soluble agricultural chemicals into an irrigation system. This method involves dispersing the chemical by passing a pressured stream containing the chemical through an orifice. The dispersed stream passes through a check valve and subsequently through an entry line which projects into the water stream. This procedure has the disadvantage of requiring a substantial amount of additional equipment in order to effectively disperse the chemical into a stream which must then be dispersed into the main irrigation stream.

U.S. Pat. No. 3,693,656 to Sauer discloses a solution mixing apparatus for insertion into a flowing stream parallel to the flow. Anchoring the valve assembly requires a mounting structure interior the conduit carrying the flowing stream. The valve body terminates in a frustra conical cavity covered by a longitudinal flexing disk centrally anchored to the valve body by a center post. Upon sufficient pressure from a fluid inside the first conduit, the periphery of the disk is forced away from valve body at the mouth of the cavity in a "flapping" motion causing the first fluid to flow into a second fluid which is flowing inside the second conduit. This apparatus does not provide a flat valve seat perpendicular to the pressured flow of the first fluid. Therefore, the first fluid does not impinge the flat surface of the valve but rather "seeps" or "squirts out" along the interface between the edge of the frustra conical cavity and the periphery of the resilient disk. In addition the frustra conical cavity is positioned interior the valve body such that fluid can settle in the dead space in this small cavity causing clogging, this is especially true for suspensions and/or emulsions. Finally, because the disk is required to flex longitudinally, this device is inoperative if a solid-non flexible, anti-corrosion shield or valve piece is required to cover the disk when for example, a highly corrosive material is required to be mixed.

U.S. Pat. No. 3,464,626 (1969) to Stamps et al is a continuation-in-part of U.S. Pat. No. 3,375,976 (1968) which is a continuation-in-part of U.S. Pat. No. 3,326,232 (1967). U.S. Pat. No. 3,464,626 discloses a process and apparatus for evenly applying highly water insoluble agricultural chemicals to farmland at variable intensities. The process and apparatus continually agitates a suspension of the insoluble chemical before it passes through a flow meter, a control valve, an orifice plate, a check valve, and finally through a nipple placed in the center of the diameter of the irrigation pipe to be distributed over the farmland in the irrigation water. There is a pressure drop across the control valve and the orifice which serves to keep the insoluble chemical in suspension long enough to disperse the suspension into the irrigation water through the nipple and distribute the chemical evenly over the farmland with the irrigation water. In the disclosed process and apparatus, the check valve and nipple are separated by a length of transparent pipe in order to allow the operator to visually inspect the check valve for jamming and clogging by the chemical. When the check valve does jam or clog, the transparent pipe is removed so the valve may be cleaned. This process and apparatus for applying water insoluble agricultural chemicals to farmland does not immerse the check valve in the flowing stream of irrigation water, which makes the check valve vulnerable to jamming and clogging by buildup of the chemical.

SUMMARY OF THE INVENTION

It has been found that the above described disadvantages can be overcome with the valve of the instant invention. The instant fluid dispersing valve has a valve body or assembly preferably mounted perpendicularly to the flow of the flowing stream and disperses the fluidic substance to be admixed parallel to the flow of the flowing stream. The fluid dispersing check valve system of the instant invention comprises a conduit having a passage extending longitudinally therethrough. The passage has an inlet end and an outlet end and an orifice circumscribed by a substantially flat valve seat located at the outlet end. A housing, adapted to encompass the valve seat, has one end adapted to retain therein an elastomeric, substantially flat valve means adapted to sealably engage the valve seat. The other end of the housing is circumferentially attached to the outlet end of the conduit such that the elastomeric valve means is brought into resilient, sealing engagement with the valve seat. The passage in the conduit communicates with the flowing stream by means of at least one opening in the housing when the valve is open.

In the closed or "off" configuration, the pressure of the fluidic substance is less than the combined pressure by which the elastomeric member is held in sealing engagement with the valve seat and the pressure of the flowing stream. Thus, the fluidic substance can be under pressure and the valve will remain closed. In this closed or "off" position the elastomeric member seals the flowing stream from the interior of the housing through the at least one opening. Thus, when the valve is off, fluid does not enter the flowing stream, and the flowing stream does not enter into the interior of the housing.

When the valve is in the open or on position, the pressure of the fluidic substance is increased to a level necessary to overcome the pressure by which the elastomeric member is held against the valve seat. The fluidic substance, under pressure, exiting the passageway impinges upon the substantially flat valve means resiliently opening the valve to allow the fluidic substance to pass through the at least one opening to be admixed into the flowing stream. The elastomeric pressure on the valve seat causes the impinging liquid to disperse as tiny droplets or micelle like moieties prior to integrating with the flowing stream. This facilitates intimate admixing of the substances. Because the pressure of the fluidic substance is greater than the pressure of the flowing stream, the flowing stream cannot enter into the interior of the housing to cause back flow or contamination.

In operation, the fluidic substance is placed under pressure and caused to flow through the conduit urging the elastomeric member to disengage from the valve seat. When the elastomeric member has disengaged from the valve seat, the fluidic substance flows past the elastomeric member and through at least one opening in the housing and into the flowing stream in which the valve is immersed.

Unless otherwise qualified, the phrase "at least one opening," includes any hole, aperture or orifice, includes any number of holes, apertures or orifices, includes any shape of holes, apertures or orifices, includes any arrangement of holes, apertures or orifices, or any combination thereof which function to provide some dispersion of the fluidic substance into the flowing stream and/or the flowing stream into the fluidic substance.

In one embodiment, a plurality of channeled openings in the housing, preferably having beveled edges, provides a directed flow of the flowing stream through the opening to better admix the fluidic substance with the flowing stream. For the purpose of explanation without limitation, it is believed that the presence of the beveled channel creates eddies to facilitate the dispersion of the fluidic substance, thereby preventing the fluidic substance from concentrating around and corroding the housing.

In another embodiment, the valve is reduced in size to precisely disperse small volumes of chemicals. It is to be inserted into irrigation lines which irrigate turfs and other vegetation commonly found around a private home. This embodiment takes advantage of the minimal moving parts of the valve by miniaturizing the housing and valve mechanism. At these reduced fluidic substance pressures, satisfactory admixing is achieved by using smaller dispersal openings in the housing.

Another embodiment has the housing adapted to adjustably alter the force urging the elastomeric member into sealable engagement with the valve seat. This embodiment allows the pressure at which the valve opens to be varied by altering the force by which the elastomeric member sealably engages the valve seat. Altering the sealing pressure is achieved by "pre-loading" the elastomeric member against the valve seat. The pre-loading is achieved by compressing the elastomeric member against the valve seat which then increases the pressure against which the fluidic substance must urge the elastomeric member away from the valve seat. This embodiment enables the valve to disperse a wider variation of fluidic substance volumes by lowering the minimum dispersal pressure.

Another embodiment incorporates a flat disk as a valve element to seal against the valve seat. This embodiment enables highly corrosive fluids or solvents which might dissolve the elastomeric member to be dispersed. This embodiment has a flat disk comprising inelastic or chemically inert material interposed between the elastomeric member and the valve seat. The disk is adapted to sealably engage the valve seat and thereby protect the elastomeric member from the chemical or mechanical effects of the fluidic substance.

Still another embodiment incorporates an adjustable means to alter the position of the valve with respect to the center of a stream of carrier fluid. In this embodiment, adjustable means preferably include a bulkhead fitting into which the valve conduit can be slidably inserted until a desired position between the valve and the center of the flowing stream is reached. The bulkhead is then adjusted to maintain the valve in the desired position with respect to the flowing stream.

The present invention broadly contemplates inserting the valve of the instant invention into a carrier fluid and injecting a controlled amount of fluidic substance through the valve and into the carrier fluid. The carrier fluid comprises one or more liquids, and the one or more liquids are preferably selected from the group consisting of water, aqueous solutions, ammonium compounds and organic compounds.

One aspect of the present invention contemplates inserting the valve into an organic chemical dispersion systems called "ground rigs" that spray organic chemicals onto flora such as agricultural crops or turf-grass. In this preferred aspect, the fluidic substance released from the valve comprises at least one organic chemical that is injected into a carrier fluid comprising at least one other organic chemical. The one or more organic chemicals in the carrier fluid are preferably selected from the group consisting of fertilizers, pesticides, fungicides, insecticides and herbicides.

Another preferred aspect of the present invention contemplates inserting the valve into irrigation lines which are used to irrigate public or commercial-use turfs such as public parks, golf courses, athletic fields, and the like. In this preferred aspect, a carrier fluid comprising water or an aqueous solution passes through the irrigation line while a fluidic substance is injected into the carrier fluid by the valve of the present invention. In this preferred aspect of the invention, the fluid stream comprises at least one substance selected from the group consisting of fertilizers, pesticides, fungicides insecticides and herbicides. The fluidic substance may be formulated as an acid, a base, or a salt.

Still another preferred aspect of the present invention contemplates using the valve to prepare non-arable land for cultivation by adding chemicals to the soil to alter and supplement its chemical composition. In this preferred aspect, a fluidic substance is injected through the valve into a carrier fluid and then the mixture of fluidic substance and carrier fluid are applied to crops or the non-arable land.

Another aspect of the present invention contemplates use in the petrochemical, chemical refinement, and other manufacturing process where the valve is subjected to a hostile chemical environment such as highly corrosive chemicals. The present invention is also contemplated for use in the food and beverage industry for the mixing of ingredients to foodstuffs and beverages.

In accordance with the method of the instant invention a fluidic substance is dispersed into a flowing stream. The method is composed of passing or flowing a fluidic substance through a passage in a conduit and exiting the fluidic substance through an orifice. Upon exiting the fluidic substance through an orifice, displacing an elastomeric member, fitted inside a housing, with the exiting fluidic substance from a valve seat which surrounds the orifice. After displacing the elastomeric member, passing or flowing the fluidic substance past the elastomeric member and passing or dispersing the fluidic substance through at least one opening in the housing into the flowing stream. Upon terminating the flow of fluidic substance, resealing the orifice by urging the elastomeric member into sealing engagement with the valve seat.

BRIEF DESCRIPTION OF THE DRAWINGS

FIG. 4 shows the instant invention being used in an irrigation system with "pop-up" sprinkler heads.

FIG. 5 depicts a detail of the valve with a portion of the housing removed to show the interior parts therein.

FIG. 6 represents another embodiment of the instant invention.

DETAILED DESCRIPTION OF THE INVENTION

Figure 1:
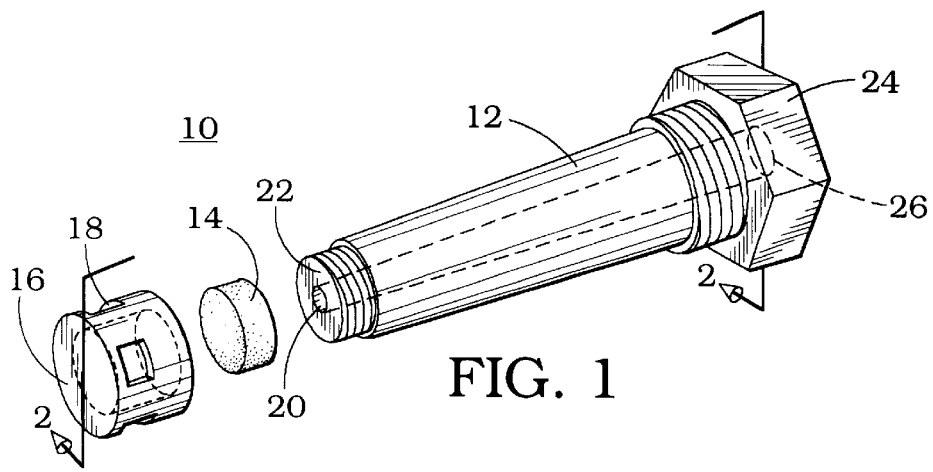
FIG. 1 shows an exploded view of the device of the instant invention.

FIG. 1 illustrates a preferred embodiment of the instant valve 10. Conduit 12 is shown having a fitting 24 on an inlet end and a housing 16 on an outlet end. A passage passes longitudinally through the conduit 12 and terminates in a orifice 20 at the outlet end of the conduit 12. Surrounding the orifice 20 is a valve seat 22. An elastomeric member 14 is retained in the housing 16 and is sealably urged against the valve seat 22. The housing 16 has channel-like openings 18 with beveled edges.

The housing 16 contains an elastomeric member 14, and the interior of the housing 16 acts to sealably retain the elastomeric member 14. Although it is preferred that the housing 16 be substantially cylindrical in shape, other configurations are contemplated as functioning equivalently. For example, housings having the lateral cross section of a square, triangle, rectangle, ellipse, etc. function satisfactorily and are therefore considered to be within the scope of the instant invention.

The valve may be a single piece comprising a housing 16 and a conduit 12, or alternatively, the valve may comprise a plurality of separate pieces including the housing 16 and the conduit 12 that are connected together. When the housing 16 and conduit 12 are originally separate pieces, they may be connected by any appropriate means. For example, the housing 16 can be glued, screwed, molded, or thermal or solvent welded onto said conduit 12 depending on the materials of construction.

In a preferred embodiment, the housing 16 is provided with a plurality of openings 18. These openings 18 in the housing 16 allow the fluidic substance passing from the orifice 20 to rapidly disperse into the flowing stream. The term "opening" as used herein contemplates a variety of equivalent configurations. For example, holes, squares, rectangles, other polygons, spiral openings, channels, slots, etc., can be used. The openings can occupy as much of the surface area of the housing 16 as possible, however, it is necessary that there be sufficient closed surface area of the housing to retain the elastomeric member 14 within the housing 16. It should be noted that other embodiments contemplated by the inventor include an embodiment with only one opening, an embodiment with openings occupying less than 50% of the housing's surface area, and an embodiment where there are a variety of shapes of openings, all of which are indicated by the phrase "at least one opening."

The elastomeric member 14 seals against the sides of the housing 16 in order to maintain the most efficient mixing of the fluidic substance. To maintain maximum mixing efficiency it is preferred that the elastomeric member 14 have a well defined shape, although the elastomeric member 14 can be constructed from a combination of elements. The elastomeric member 14 must be capable of effectively sealing the orifice to prevent movement of the fluidic substance from the orifice 20 when it is in contact with the valve seat 22. The elastomeric member 14 must also have sufficient structural integrity to avoid distortion as the result of fluidic substance or flowing stream pressure. The elastomeric member 14 is preferably made from organic polymers, and more preferably the elastomeric member 14 is made from one or more materials selected from the group consisting of silicon, synthetic rubber, natural rubber, viton, neoprene, Buna-N rubber and Teflon.

The valve 10 of the instant invention can readily disperse a fluid flow as low as 0.0001 gallon per hour up to a flow rate as high as about 3000 gallons per hour, preferably from 0.001 gallon per hour to 1 gallon per hour, and more preferably from 0.025 gallons per hour to 0.075 gallons per hour. For flow rates in the range of about 0.1 to about 35 gallons per hour, an orifice in the range of about 0.125 inch can be used to provide satisfactory results. For flow rates in the range of about 35 to about 130 gallons per hour, an orifice in the range of about 0.250 inch is preferably used.

The instant valve 10 can be constructed from any material having suitable chemical resistance and strength. The design of the instant valve 10 allows the use of lower strength and less corrosion resistant materials for construction. In the instant valve 10, the moving flowing stream constantly washes these parts free of any corrosive chemical. Also, the housing 16 is not subjected to severe lateral forces as in for example, the Savage valve. Thermoplastic resins can be used in construction of the conduit 12, fitting 24 and housing 16. It is preferred that reinforced resins be used in order to provide additional strength. For example, glass reinforced polyolefins, polyesters, or polyamides can be used. It is preferred that the conduit 12, fitting 24, and housing 16 be prepared in one piece preferably by injection molding. Although not required, manufacture by injection molding is made easier by tapering the internal and external diameter of the conduit 12 to ease withdrawal from the injection mold.

Figure 2:
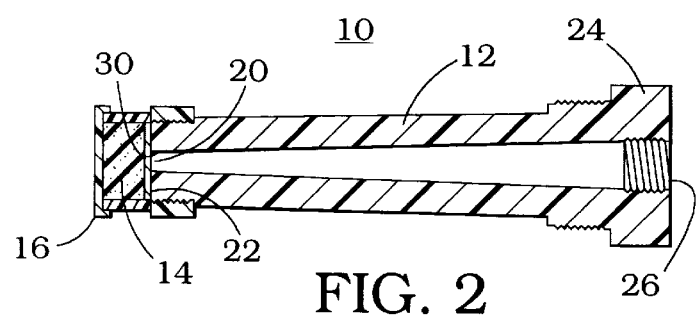
FIG. 2 shows a cross section of the embodiment of the valve of FIG. 1 with the addition of a flat valve element.

Referring to FIG. 2, a cross section of the valve 10 is shown with the addition of a flat valve element 30 interposed inside the housing 16 between the elastomeric member 14 and the valve seat 22. Also shown is housing 16, the valve seat 22 and the orifice 20. At the end of the conduit 12 opposite from the housing 16 is the passage 26 and fitting 24. The flat valve element 30 is urged against and seals against the valve seat 22 by the elastomeric member 14 to prevent fluidic substance from exiting the orifice 20 of the conduit 12. A flat valve element 30 is preferred where the fluidic substance is corrosive, or a solvent to the material comprising the elastomeric member 14. Because the flat valve element 30 is urged against the valve seat 22 by the elastomeric member 14, the flat valve element 30 need not be highly elastic and can be made from substantially rigid materials such as stainless steel, ceramic, glass, and the like. If desired, the flat valve member 30 can also be made from any suitable elastic material.

Figure 3:
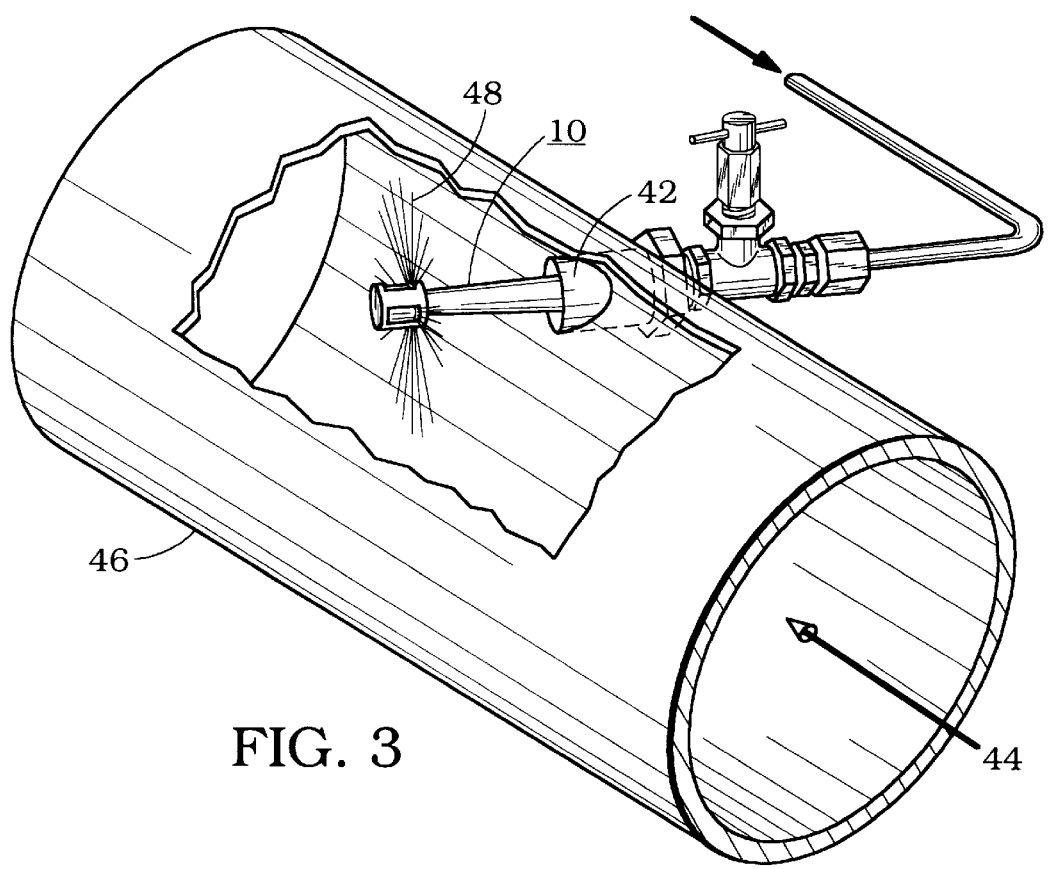
FIG. 3 represents the operation of the instant invention in which the valve is inserted into an flowing stream.
Figure 7:
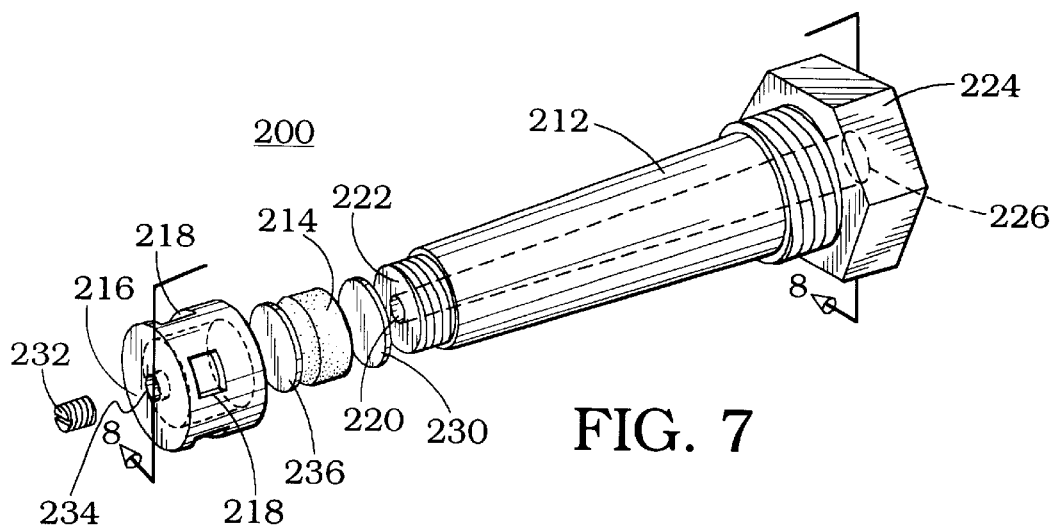
FIG. 7 shows an embodiment of the instant invention with the housing adapted so that the valve may be adjusted to open at different pressures.
Figure 8:
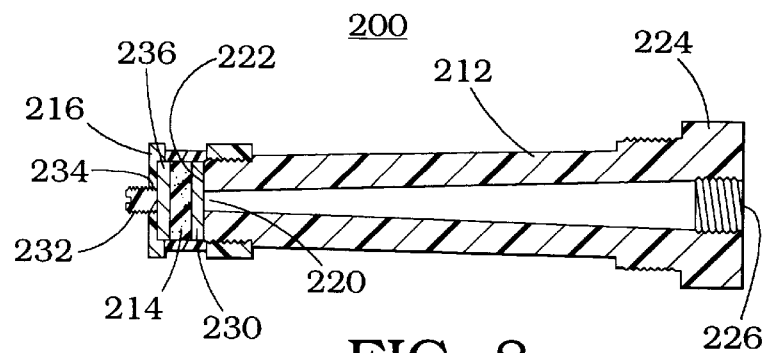
FIG. 8 shows a cross-section of the embodiment of the valve shown in FIG. 1 wherein the housing is adapted so that the valve may be adjusted to open at different pressures.
Figure 9:
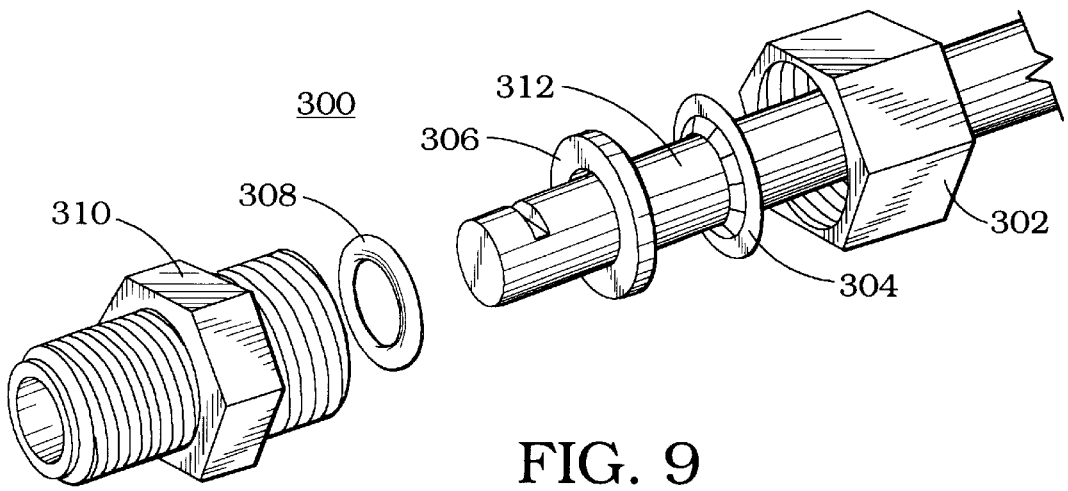
FIG. 9 shows the device of the instant invention adapted so that the valve position may be adjusted with respect to the center of a flowing stream.

Referring to FIG. 3, the valve 10 is shown, mounted by a bulkhead 42, into a pipe 46 carrying a flowing stream 44 so that the fluidic substance 48 being dispersed is injected into the flowing stream 44 substantially near the center of the diameter of the pipe 46. This locates the dispersed fluidic substance 48 in that portion of the flowing stream 44 with the highest flow velocity. The high velocity flowing stream 44 serves to rapidly remove the fluidic substance 48 from openings of the valve 10 which can prevent accumulation of the fluidic substance 48, which would otherwise cause jamming or clogging of the valve 10. The high velocity stream also serves to quickly and thoroughly mix the fluidic substance 48 into the flowing stream 44.

Referring to FIG. 4, the embodiment of the valve 100 for installation in turf irrigation systems with "pop-up" sprinkler heads is shown. In this embodiment the valve is reduced in size from the agricultural embodiment shown in FIGS. 1–3, in order to throughly mix and precisely meter small amounts of fluidic substance into the flowing stream. The small size of the valve 100 also facilitates placing the valve 100 in smaller sized irrigation pipes such as commonly used in domestic applications. The valve 100 is inserted into the irrigation pipe 152 so that the dispersed fluidic substance 158 enters the flowing stream 156 at its point of highest velocity. The flowing stream 156 with the fluidic substance 158 dispersed therein is distributed over the irrigated land through a "pop-up" valve 154.

Referring to FIG. 5, the embodiment of the instant invention with openings in the housing to maximize dispersal of the fluidic substance in the flowing stream is shown. The housing 66 has channel-like openings 62 where the walls of the channel 74 are beveled to guide a portion of the flowing stream next to the opening 62. The valve mechanism is made up of one or more elastic disks 64 inside the housing 66. These disks 64 are retained inside the housing 66 by a C-clip 70 which engages a circular groove 72, which circumscribes the internal diameter of the housing 66. Interposed between the bottom side of the C-clip and the top of the stack of elastic disks is a spacer 68 which serves to prevent the elastic disks 64 from extruding past the C-clip 70. The number of spacers 68 interposed therebetween can be varied upon removal and reinsertion of the C-clip 70. By increasing or decreasing the thickness of the spacer 68, or adding or removing such spacers 68, or doing both, the pressure necessary to open the valve can be varied. The outer circumference of the elastic disks 64 seal against the internal circumference of the housing 66 to prevent fluid or liquids from entering the housing 66.

FIG. 6 depicts the housing 116 of the miniaturized embodiment of the valve 100. As shown, the openings 118 are round holes, although other shapes of openings are contemplated including the channel-like openings depicted in FIG. 5. Interior to the housing and retained by the threaded fastener (not shown) is the conduit 112. In this embodiment, the housing 118 is almost completely enclosed by the conduit 112 and thereby protected from any dilatory effects from the flowing stream acting on the housing 118.

Referring to FIGS. 7 and 8, an embodiment of the instant invention is shown where the threshold pressure of the fluidic substance that is necessary to open the valve can be adjusted. FIG. 8 shows a cross-section of the valve 200 in FIG. 7. As shown in FIG. 7, this embodiment preferably has a conduit 212 with an inlet end, a passage 226 and a mounting flange 224 at one end. At the outlet end of the conduit 212 there is an orifice 220, an elastomeric member 214 and a pressure plate 236, which yieldingly urges the flat value element 230 into sealing engagement with a valve seat 222. The housing 216 has an opening 234 that is adapted to incorporate a threaded member 232 which can be adjusted to bear on the pressure plate 236—which in turn bears on the elastomeric member 214—with varying degrees of force. In operation, the threaded member 232 is thready engaged into the housing 216 so that one end of the threaded member 232 is in contact with the a side of the pressure plate 236 that is opposite of the elastomeric member 214, flat valve element 230, the valve seat 222, and the orifice 220. When the pressure of a fluidic substance exceeds a threshold pressure, the fluidic substance disperses out the housing 216 through an opening 218.

By rotating the threaded member 232 such that it is drawn into the housing 216, the threaded member 232 presses against the pressure plate 236 with increasing force, thereby increasing force with which the pressure plate 236 presses against the elastomeric member 232. The elastomeric member 232 then presses against the flat valve element 230 with increasing force, thereby increasing the sealing force between the flat valve element 230 and the valve seat 220. Thus, by such rotating the threaded member 232, the threshold pressure required to disperse the fluidic substance from the valve 200 can be altered. Another embodiment of the valve shown in FIG. 7 contemplates removing the flat valve element 230, and the pressure plate 236 such that the elastomeric member 232 is pressed between the threaded member 232 and the valve seat 220.

Other means to vary the compressive force of the elastic member against the valve seat are contemplated herein. These include, but are not limited to, making the housing threadably engaged to the conduit so that as the housing is rotated, the elastomeric member is compressed with a varying degree of force against the valve seat. Also contemplated is placing spacers or shims between the end of the elastic member opposite the orifice and the housing. By changing the number or thickness of shims so placed, the compressive force of the elastomeric member is altered.

FIG. 9 shows an embodiment of the present invention where the position of the valve 300 can be adjusted relative to the center of a flowing stream of a carrier fluid (not shown). In this embodiment a bulkhead 310 has a first end that may be connected to a pipe holding a flowing stream and a second threaded end, opposite the first, that may be connected to a nut 302. Sandwiched between the second end of the bulkhead 310 and the nut 302 is an o-ring 308, washer 306 and sealing ring 304.

The bulkhead 310 can slide up and down the valve conduit 312 until the nut 302 is tightened around the second end of the bulkhead 310. When the nut 302 is tightened around the second end of the bulkhead 310, the o-ring 308, washer 306 and sealing ring 304 constrict around the conduit 312 and hold the bulkhead 310 in a fixed position on the conduit 312. In order to change the position of the valve 300 with respect to a flowing stream, the nut 302 is loosened and the conduit 312 slides inside the bulkhead 310 until the desired position between the valve 300 and the flowing stream is reached. Then the nut 302 is tightened and the conduit 312 is secured by the bulkhead 310 at the desired position.

Referring again to FIGS. 1 and 2, the valve 10 is mounted in a pipe with the mounting flange 24. The housing 16 is mounted at the end of the conduit 12. The elastomeric member 14 is retained at the end of the conduit 12 by the housing 16 so that the elastomeric member 14 is within the housing 16 and is held in sealable engagement against the valve seat 22. In operation, the fluidic substance to be dispersed enters the conduit 12 at the inlet end and travels the length of the conduit 12 through the passage 26 to the orifice 20. When the hydrostatic pressure of the fluid reaches a predetermined level, such as when the fluidic substance is pumped to the valve 10 by means of a hydraulic pump, the fluidic substance pushes and holds the elastomeric member 14 away from the valve seat 22. When the elastomeric member 14 is not sealably engaged with the valve seat 22, the fluidic substance flows between the valve seat 22 and the elastomeric member 14, past the edge of the elastomeric member 14, and into the openings 18 in the housing 16. Once inside the openings 18, the fluidic substance is picked-up by the flowing stream flowing into each opening 18 and carried away by the flowing stream. Alternatively, with the appropriate opening geometry, the fluidic substance can be forcefully expelled out from under the elastomeric member 14, through the openings 18 and into the flowing stream. Alternatively, an opening geometry can be selected which both directs a portion of the flowing stream into the opening 18 and allows a portion of the fluidic substance to be forcefully expelled into the flowing stream. Since the pressure of the fluid is greater than the pressure of the flowing stream, no water flows from the stream into the orifice 20.

As the pressure of the fluid is increased beyond that necessary to open the valve 10, the elastomeric member 14 is further compressed and the volume of fluidic substance dispersing into the flowing stream is increased. When the hydrostatic pressure of the fluid falls below a predetermined level such as when the pump is shut off, the elastomeric member 14 sealably engages the valve seat 22 and prevents fluid from exiting the orifice 20, and prevents liquid from the flowing stream from entering the orifice 20. Note that any shaped orifice or configuration of orifices sufficient to allow the fluidic substance to force the elastomeric member 14 away from the valve seat 22 such that fluidic substance can be dispersed in the manner described above are contemplated herein.

Referring again to FIGS. 1 and 2, another preferred embodiment is shown having a flat valve element 30 comprising a substance such as metal or plastic which operatively connects to the bottom portion of the elastomeric member 14 and slidably moves within the inside of the housing 16. The elastomeric member 14 urges the flat valve element 30 into sealing engagement with the valve seat 22. This embodiment may be preferred when for example, the elastomeric material forming the elastomeric member 14 may become dissolved, eroded or corroded by the fluidic substance moving through the orifice 20.

Although the instant valve has preferred utility in adding agricultural chemicals to a stream of irrigation water, the valve can also be used to introduce and disperse essentially any fluidic substance into any liquid stream. Accordingly, it is not intended that this invention be limited to the chemigation field. For convenience of explanation, the instant valve is discussed in terms of the addition of agricultural chemicals to a stream of irrigation water. However, it is expected that other uses can be readily determined which involve the addition of a fluidic substance to a moving flowing stream. The instant valve has the advantage of providing significant dispersion of a fluidic substance in a stream which does not have turbulent flow.

As used herein the term "fluid" refers to any liquid including emulsions, gases and slurries of particulates suspended in a liquid. In order to be used in the instant valve, the particulates in such a slurry must be small enough to readily pass through the orifice.

In an agricultural operation, the valve 10 is inserted into an opening in an irrigation pipe through which the stream of irrigation water is passed. A preferred method of attaching the valve 10 is to provide a connector 42 in the side of the pipe 46 as shown in FIG. 3. A threaded fitting (not shown) on one end of the conduit can be used to attach the valve to the pipe. The connector 42 can be affixed to the pipe 46 by welding or any other convenient manner. It can be attached squarely on the pipe, i.e, at 90 degrees or can be angled as shown in FIG. 3. Thus, the valve can be inserted into the pipe so that conduit 12 is straight or at an angle between about 0 and about 45 degrees compared to the longitudinal axis of the pipe. This can be accomplished by using an angled conduit as discussed hereinabove, or by fitting a connector 42 at an angle, or a combination of the two.

A variety of agricultural chemicals such as fertilizers, pesticides, fungicides, insecticides, herbicides, and combinations thereof can be dispersed into a stream of irrigation water using the instant valve. Alternatively, the chemicals can be dispersed into a steam of other agricultural chemicals. The chemicals can be in the form of solutions, emulsions, suspensions or colloids.

In accordance with one embodiment, the flowing stream is organic or of a hydrophobic origin such as petroleum, oils, organic chemicals, solvents and the like. In accordance with this embodiment, the fluidic substance to be injected into the flowing stream can be either organic based, aqueous based or for example, a surfactant. As used herein, fluidic means any flowing substance which can include gas, solutions, liquid compounds, slurries, suspensoids, whether two or three phases are present, and the like. It will be apparent to the skilled artisan that the tensioning on the elastomeric member and the pressure of the fluidic substance can determine the force exerted on the valve element and in turn, on the valve seat to provide an admixing force there between.

It will be understood that the above description of the present invention is susceptible to various modifications, changes and adaptations and the same are intended to be comprehended within the meaning and range of equivalents of the appended claims.

What is claimed is:

1. A valve for dispersing a fluidic substance into a carrier fluid comprising:

(a) a conduit having a passage therethrough to carry the fluidic substance, said passage having an inlet end and an outlet end, said outlet end defining an orifice proximate said outlet end;

(b) a housing encompassing said outlet end, said housing having a first retaining end and a second end fastened to said conduit and having at least one opening therein, said opening being adapted to allow a portion of the carrier fluid flowing past said housing to enter said at least one opening for dispersing said fluidic substance into said carrier fluid;

(c) a valve seat connected to said conduit and circumscribing said orifice; and (d) at least one elastomeric member sealably retained in said housing, said member operatively connected to said retaining end by a force that yieldingly urges said elastomeric member into sealing engagement with said valve seat to control the flow of the fluidic substance therethrough.

2. The valve of claim 1, wherein said fluidic substance comprises at least one organic compound selected from the group consisting of fertilizers, pesticides, fungicides, insecticides and herbicides.

3. The valve of claim 1, wherein said carrier fluid comprises water.

4. The valve of claim 3, wherein said carrier fluid is utilized in the irrigation of turf-grasses.

5. The valve of claim 3 wherein said carrier fluid is utilized in the irrigation of crops.

6. The valve of claim 3 wherein said carrier fluid is distributed onto a surface selected from the group of terrains consisting of unplanted land, farmland, golf course turf, athletic field turf, public parkland, and domestic turf.

7. The valve of claim 3 wherein said carrier fluid is dispersed by a pop up valve.

8. The valve of claim 1 wherein said housing incorporates an adjustable means to alter the force which yieldingly urges said elastomeric member into sealing engagement with said valve seat.

9. The valve of claim 1 wherein said valve incorporates an adjustable means to alter the position of the valve with respect to a center of a stream of said carrier fluid.

10. The valve of claim 9 wherein said adjustable means to alter the position of the valve comprises a bulkhead, wherein said conduit is slidably adjustable inside said bulkhead for positioning the valve with respect to the center of the stream.

11. The valve of claim 1 wherein said at least one opening in said housing is shaped to create an eddy in the carrier fluid inside said at least one opening.

12. The valve of claim 1 wherein said at least one opening in said housing is a channel with a beveled edge.

13. The valve of claim 1 wherein said at least one opening in said housing comprises a plurality of openings.

14. A valve for dipsersing a fluidic substance into a carrier fluid comprising:

(a) a conduit having a passage therethrough to carry the fluidic substance, said passage having an inlet end and an outlet end, said outlet end defining an orifice proximate said outlet end;

(b) a housing encompassing said outlet end, said housing having a first retaining end and a second end fastened to said conduit and having at least one opening therein, said opening being adapted to allow a portion of the carrier fluid flowing past said housing to enter said at least one opening for dispersing said fluidic substance into said carrier fluid;

(c) a valve seat connected to said conduit and circumscribing said orifice;

(d) at least one elastomeric member sealably retained in said housing; and (e) a flat valve element interposed between said valve seat and said elastomeric member, wherein said elastomeric member yieldingly urges said flat valve element into sealing engagement with said valve seat to control the flow of the fluidic substance through said orifice.

15. A valve for dispersing a fluidic substance into a carrier fluid comprising:

(a) a conduit having a passage therethrough to carry the fluidic substance, said passage having an inlet end and an outlet end, said outlet end defining an orifice proximate said outlet end;

(b) a housing encompassing said outlet end, said housing having a first retaining end and a second end fastened to said conduit and having at least one opening therein, said opening being adapted to allow a portion of the carrier fluid flowing past said housing to enter said at least one opening for dispersing said fluidic substance into said carrier fluid;

(c) a valve seat connected to said conduit and circumscribing said orifice;

(d) at least one disk retained, by a clip, inside said housing having circular grooves circumscribed around the internal diameter of said housing and said clip engaging said circular grooves; and (e) at least one elastomeric member sealably retained in said housing, said member operatively connected to said at least one disk by a force that yieldingly urges said elastomeric member into sealing engagement with said valve seat to control the flow of the fluidic substance therethrough and that urges said disk into sealable engagement with said housing to prevent fluid or liquids from entering said housing.

16. The valve of claim 15 wherein at least one disk comprises a plurality of disks.

17. The valve of claim 15 wherein interposed between the bottom side of said clip and the top of said at least one disk is at least one spacer.

18. The valve of claim 17 wherein at least one spacer comprises a plurality of spacers.

19. The valve of claim 17 wherein the number of said spacers are used as adjustable means to alter the force necessary to open said valve.

20. A method for dispersing a fluidic substance into a carrier fluid, the method comprising:

(a) passing the fluidic substance under pressure through a conduit means having an inlet end, an outlet end, a passageway therebetween, and an orifice proximate said outlet end, said orifice circumscribed by a valve seat;

(b) controlling the flow of the fluidic substance through said conduit by yieldingly urging an elastomeric member into sealing engagement with said valve seat; wherein said elastomeric member is sealably retained in a housing having a first retaining end operatively connected to said elastomeric member, a second end fastened to said conduit, and at least one opening to allow a portion of the carrier fluid flowing past said housing to enter said housing; and (c) passing a portion of said carrier fluid through said at least one opening and into said housing for mixing with said fluidic substance.

21. The method of claim 20 wherein said fluidic substance comprises at least one organic compound selected from the group consisting of fertilizers, pesticides, fungicides, insecticides, and herbicides.

22. The method of claim 20 wherein said carrier fluid comprises water.

23. The method of claim 22 wherein the carrier fluid is utilized in the irrigation of turf-grasses.

24. The method of claim 22 wherein said carrier fluid is distributed onto a surface selected from the group of terrains consisting of unplanted land, farmland, golf course, turf athletic field turf, public parkland, and domestic turf.

25. The method of claim 22 wherein said carrier fluid is dispersed by a pop up valve.

26. The method of claim 20 wherein said carrier fluid is utilized in the irrigation of crops.

27. The method of claim 20 further comprising adjustably altering the force by which said elastomeric member is yieldingly urged into sealing engagement with said valve seat.

28. The method of claim 20 further comprising the step of altering the position of the valve with respect to a center of a stream of said carrier fluid.

29. The method of claim 28 wherein said altering step comprises slidably adjusting the position of the valve with respect to the center of the stream.

30. The method of claim 28 further comprising directing a portion of the carrier fluid by shaping said at least one opening to create an eddy in the carrier fluid inside at least one opening.

31. The method of claim 20 further comprising directing a portion of said carrier fluid into at least one opening in said housing.

32. The method of claim 20 wherein said at least one opening comprises a channel with a beveled edge.

33. The method of claim 20 further comprising directing a portion of said flowing stream into a plurality of openings in said housing.

34. The method of claim 20 further comprising:
retaining at least one disk with a clip inside said housing; and
bringing said disk into sealable engagement with said housing to prevent fluid or liquids from entering said housing.

35. The method of claim 34 further comprising the step of interposing at least one spacer between the bottom side of said clip and the top of said at least one disk.

36. A method for dispersing a fluidic substance into a carrier fluid, said method comprising:

(a) passing the fluidic substance under pressure through a conduit means having an inlet end, an outlet end, a passageway therebetween, and an orifice proximate said outlet end, said orifice circumscribed by a valve seat;

(b) controlling the flow of the fluidic substance through said conduit by yieldingly urging an elastomeric member into a flat valve element to force it into sealing engagement with said valve seat; wherein said elastomeric member is sealably retained in a housing having a first retaining end operatively connected to said elastomeric member, a second end fastened to said conduit, and at least one opening to allow a portion of the carrier fluid flowing past said housing to enter said housing; and (c) passing a portion of said carrier fluid through said at least one opening and into said housing for mixing with said fluidic substance.

* * *